US005745790A

United States Patent [19]
Oskouy

[11] Patent Number: 5,745,790
[45] Date of Patent: Apr. 28, 1998

[54] METHOD AND APPARATUS FOR REPORTING THE STATUS OF ASYNCHRONOUS DATA TRANSFER

[75] Inventor: Rasoul M. Oskouy, Fremont, Calif.

[73] Assignee: Sun Microsystems, Inc., Mountain View, Calif.

[21] Appl. No.: 812,445

[22] Filed: Mar. 6, 1997

Related U.S. Application Data

[63] Continuation of Ser. No. 499,283, Jul. 7, 1995, abandoned.

[51] Int. Cl.⁶ .............................. G06F 9/28; G06F 13/14
[52] U.S. Cl. .................. 395/853; 395/855; 395/200.62; 395/200.43
[58] Field of Search ....................... 395/853, 854, 395/85.5, 200.62, 200.43, 839, 437

[56] References Cited

U.S. PATENT DOCUMENTS

| H513 | 8/1988 | Dunne et al. | 364/516 |
|---|---|---|---|
| 3,916,385 | 10/1975 | Parmar et al. | 340/172.5 |
| 5,287,476 | 2/1994 | Keener et al. | 395/425 |
| 5,477,541 | 12/1995 | White et al. | 370/94.1 |
| 5,495,482 | 2/1996 | White et al. | 370/85.11 |
| 5,544,317 | 8/1996 | Berg | 395/200.04 |

OTHER PUBLICATIONS

"Advanced Configuration and Power Interface Specification", Revision 1.0, Intel/Microsoft/Toshiba, Dec. 22, 1996, pp. 1-295.

*Primary Examiner*—Thomas C. Lee
*Assistant Examiner*—Rehana Perveen
*Attorney, Agent, or Firm*—Blakely Sokoloff Taylor & Zafman

[57] ABSTRACT

A method and apparatus of reporting the status of data transfer between software and hardware in a computer system is disclosed. Software provides empty descriptors to the hardware for posting completion updates of transfers. More particularly, the software provides the number of the last available descriptor to a first storage field in a storage location which is accessible to the hardware. The hardware accounts for the number of the descriptors it has used for reporting completion updates by posting the number of used descriptors to a second storage field in the storage location. To determine if more descriptors are available, the hardware compares the contents of the first storage field to that of the second storage field. If the contents of the first and second storage fields are equal, the hardware has reached the last descriptor in the completion ring. If the fields are not equal, one or more descriptors are available for the hardware to use.

20 Claims, 5 Drawing Sheets

METHOD AND APPARATUS FOR REPORTING THE STATUS OF ASYNCHRONOUS DATA TRANSFER

This is a Continuation Application of application Ser. No. 08/499,283 (now-abandoned), filed on Jul. 7, 1995.

BACKGROUND OF THE INVENTION

1. Field of the Invention

The present invention relates generally to the field of computer systems and, in particular, to a method and apparatus for reporting data transfer between hardware and software in computer systems.

2. Description of the Related Art

In transferring data within a computer system, coordination between hardware and software is traditionally accomplished through the use of a semaphore mechanism which incorporates the use of OWN bits in descriptor rings to indicate current ownership of each descriptor on the ring. A descriptor ring is a data structure having a plurality of entries (for example, 1 to N) which are arranged in a circular fashion. The content of each entry in the descriptor ring is known as a descriptor. A typical descriptor contains a base address field which provides the base of the page table address in a segmented-page organization or the block base address in a segment register organization. Each descriptor includes a bit which is set to a '1' if the entry is owned by hardware or a '0' if the entry is owned by software. This bit is known as an "OWN" bit. The owner of the descriptor is responsible for releasing ownership when it updates the descriptor. Thus, when software has completed the posting of transmission packets, it sets the OWN bit to a 1 and when hardware has completed transmission of a packet, it clears the OWN bit.

In conventional systems, hardware has to poll the completion data structure in host memory to determine the status of the OWN bit of the descriptors. This task is performed to determine if descriptors are available for the hardware to provide transactional updates. These visits to host memory may however, be futile because all descriptors may be unavailable. As a result, the hardware has to continue polling memory until the software posts packets for transmission and signifies the completion of this task by setting the OWN bit. The requirement for polling decreases the bandwidth for the Input/Output system that can otherwise be used by other devices sharing the same system.

Accordingly, there is a need in the technology for a method and apparatus for reporting the status of data transfer between hardware and software in computer systems through the efficient use of completion descriptor rings which eliminates the need for polling host memory prior to reporting the status.

BRIEF SUMMARY OF THE INVENTION

A method and apparatus of reporting the status of data transfer between software and hardware in a computer system is disclosed. Software provides empty descriptors to the hardware for posting completion updates of transfers. More particularly, the software provides the number of the last available descriptor to a first storage field in a storage location which is accessible to the hardware. The hardware accounts for the number of the descriptors it has used for reporting completion updates by posting the number of used descriptors to a second storage field in the storage location. To determine if more descriptors are available, the hardware compares the contents of the first storage field to that of the second storage field. If the contents of the first and second storage fields are equal, the hardware has reached the last descriptor in the completion ring. If the fields are not equal, there are one or more descriptors available for the hardware to use. The present invention eliminates the need for polling host memory to determine if descriptors are available for reporting the status of a transaction.

DETAILED DESCRIPTION OF THE INVENTION

Figure 1:
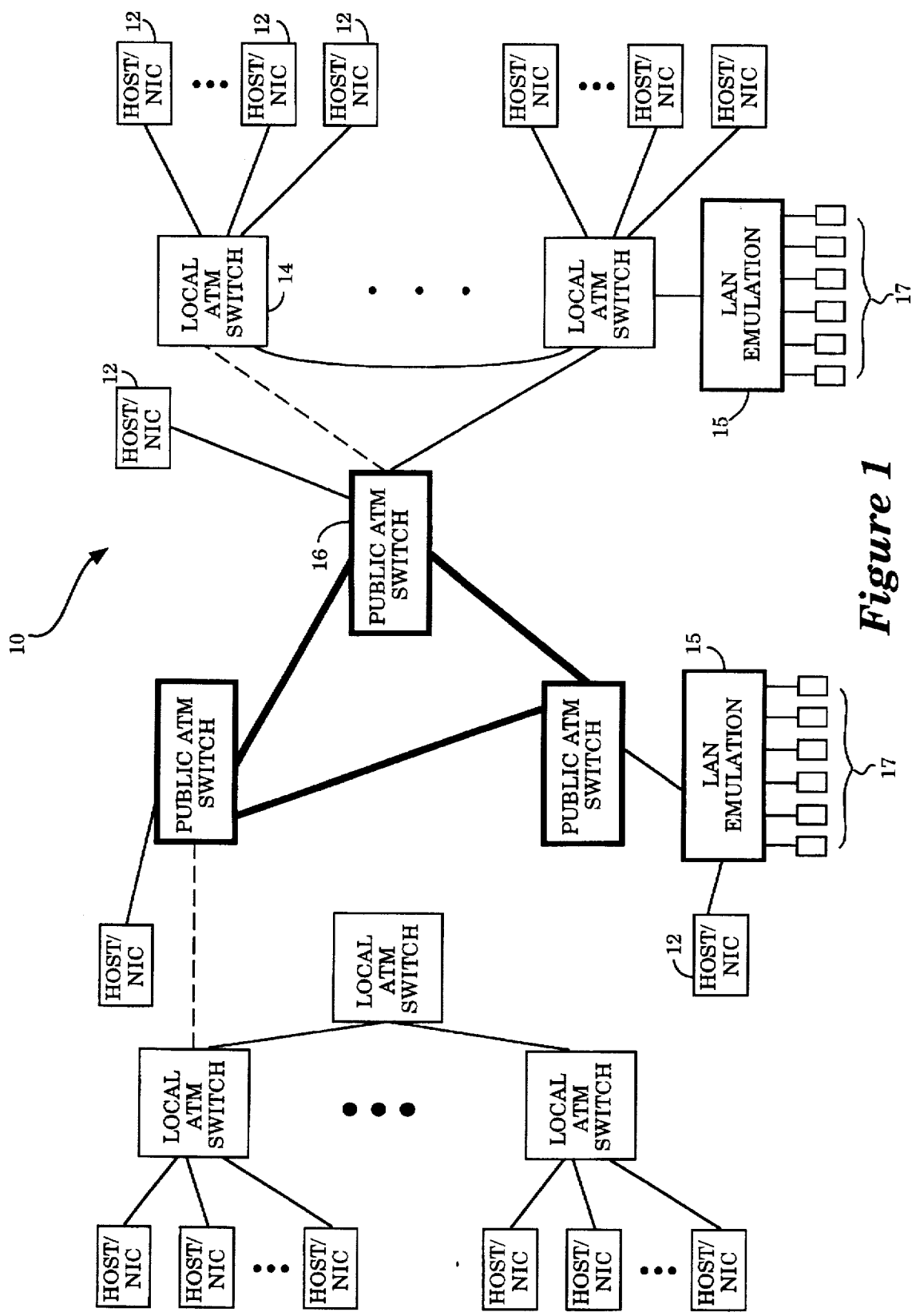
FIG. 1 illustrates an exemplary computer system network incorporating an asynchronous transfer mode network interface circuit which utilizes the method and apparatus of reporting data transfer of the present invention.

FIG. 1 illustrates an exemplary computer system network incorporating the ATM network interface circuit which utilizes the method and apparatus of reporting data transfer of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
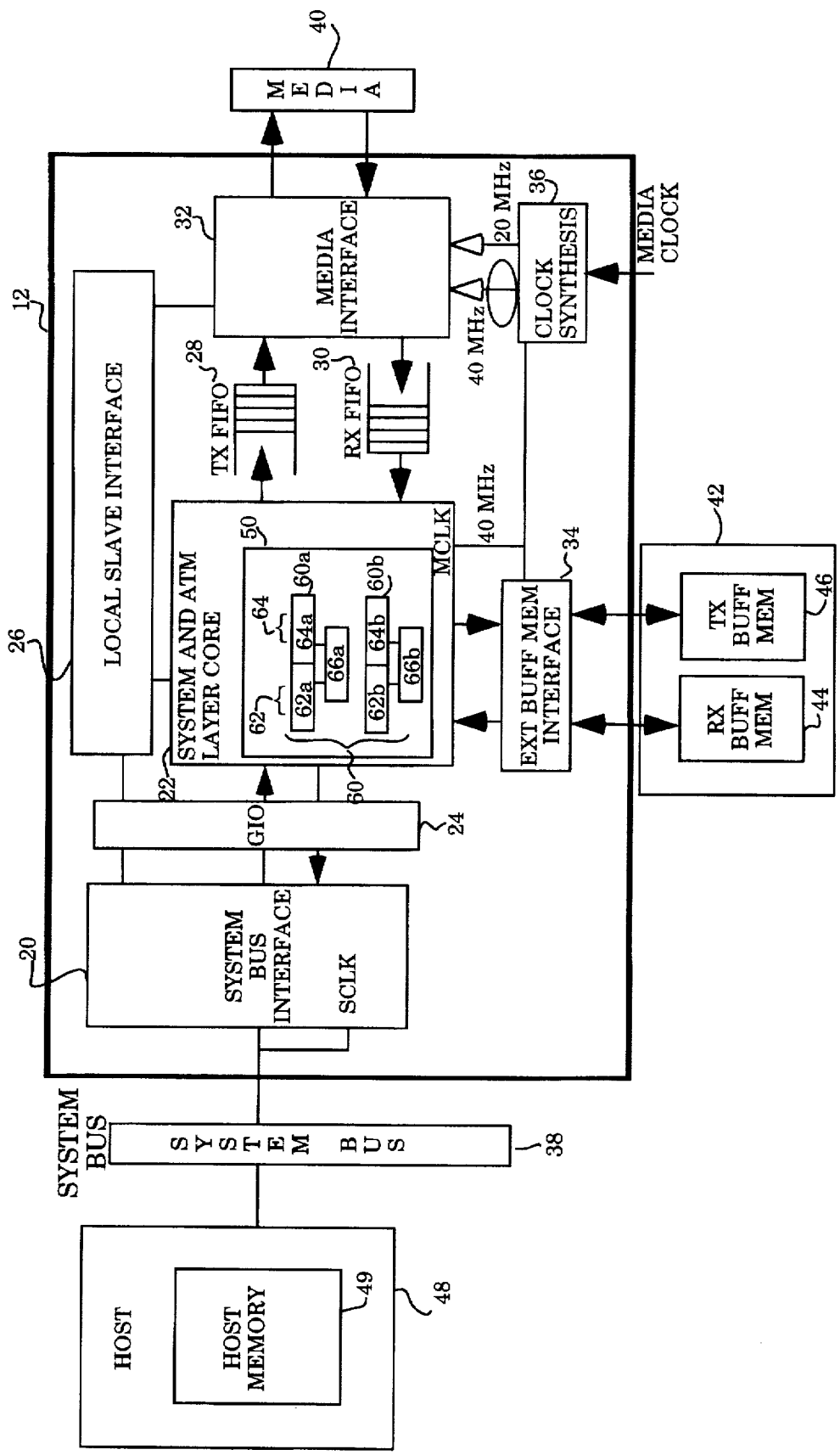
FIG. 2 is an overall system diagram illustrating the architecture of the asynchronous transfer mode network interface circuit which utilizes the method and apparatus of reporting data transfer in accordance with a preferred embodiment of the present invention.

FIG. 2 is a simplified system diagram illustrating the architecture of the ATM NIC 12 which utilizes the method and apparatus of reporting data transfer in accordance with a preferred embodiment of the present invention. The ATM NIC 12 interfaces a host computer system 48 coupled through system bus 38 to the network media 40 operating in accordance with the ATM protocol.

The ATM NIC 12 shown includes a System Bus interface 20, a Generic Input/Output ("GIO") interface 24, a System and ATM Layer Core 22, a Local Slave interface 26, a transmit (TX) FIFO 28, a receive (RX) FIFO 30, a Media interface 32, an External Buffer Memory Interface 34 and a clock synthesis circuit 36.

Together, the elements 20-36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system 48. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit cells for transmission to the Media 40 through Media interface 32. The Core 22 also comprises reassembly logic to facilitate reassembly of the received cells to packets.

The Core 22 further includes a storage block 50 which includes a first storage location 60a and a second storage location 60b, for use in reporting data transfer for all channels supported by the ATM NIC 12 in accordance with a preferred embodiment of the present invention. Preferably, the storage location 60a is used for reporting data transmission and the storage location 60b is used for reporting data reception in accordance with the teachings of the present invention, as discussed in detail in the following sections. The storage locations 60a and 60b each includes a first storage field 62 and a second storage field 64. A comparing circuit 66 is coupled to each storage location 60a and 60b. The comparing circuit 66 is used to compare the contents of the first storage field 62 and the second storage field 64. An example of the comparing circuit 66 is an exclusive-OR gate. In particular, storage location 60a includes a first storage field 62a and a second storage field 64a, while storage location 60b includes a first storage field 62b and a second storage field 64b. A comparing circuit 66a for comparing the contents of the first storage field 62a and the second storage field 64a, is coupled to storage location 60a. Likewise, a comparing circuit 66b is coupled to the storage location 60b, and is used to compare the contents of the first storage field 62b and the contents of the second storage field 64b. For discussion purposes, the storage locations 60a and 60b, the first storage fields 62a and 62b, the second storage fields 64a and 64b, and the comparing circuits 66a and 66b will be referred in general as the storage location 60, the first storage field 62, the second storage field 64 and the comparing circuit 66, respectively.

The TX and RX FIFOS 28, 30, coupled between the Core 22 and the Media Interface 32, are used to stage the transmit and receive cell payloads of the transmit and receive packets respectively. The Media Interface 32 transmits and receives cells to the Media 40 of the network, driven by clock signals provided by Clock Synthesis Circuit 36. Preferably the Media, and therefore the Media interface 32, conforms to the Universal Test and Operations Physical Interface for ATM ("UTOPIA") standard, as described by the ATM Forum Ad Hoc specification. To conform to the UTOPIA specification, the clock synthesis circuit 36 provides either a clock signal of 20 MHz or 40 MHz to enable the Media interface 32 to support a byte stream at 20 MHz for 155 Mbps or a 16 bit stream at 40 MHz for a 622 Mbps data stream.

In the present embodiment, the Media Interface 32 receives 62-byte data cells each having a 4-byte cell header and a 48-byte payload from the TX FIFO 28. The Media Interface 32 inserts a checksum as a fifth byte to the cell header into each cell prior to providing the 53-byte data cell to the Media 40. Conversely, when the Media Interface 32 receives cells from the Media 40, it examines the checksum in the fifth byte of each cell to determine if the checksum is correct. If so, the byte representing the checksum is stripped from the cell and the cell is forwarded to the RX FIFO 30. Otherwise, the entire cell is dropped.

The System Bus Interface 20 and GIO interface 24 insulate the host computer system 48 from the specifics of the transfer to the Media 40. Furthermore, the Core 22 is insulated from the specifics of the system bus 38 and host specifics. In the present preferred embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus. It is contemplated that the System Bus Interface 20 can be configured to conform to different host computer system busses. The System Bus Interface 20 is also configured to transfer and receive data in accordance with the protocols specified by the GIO interface 24. The GIO interface 24 provides a singular interface through which the Core 22 communicates with the host computer. Thus, the Core 22 does not change for different embodiments of the NIC 12 which interface to different host computer systems and busses.

Three memory sub-systems are associated with the operation of the network interface circuit 12. These include the host memory 49 located in the host computer system 48, the local buffer memory 42 external to the Core 22 and control storage block 50 located within the Core 22. The ATM interface network circuit 12 manages two memory areas: the buffer memory 42 and the storage block 50. The buffer memory 42 contains packet data for all transmit and receive channels supported by the network interface circuit 12. The storage block 50 contains DMA state information for transmit and receive channels and pointers to data structures in host memory 49 for which DMA transfers are performed. The storage block 50 also contains the data structure specifics to manage multiple transmit and receive buffers in the local buffer memory 42 for packets in transition between the host 48 and the Media 40.

The host computer system 48 includes host memory 49 which contains data packets and pointers to the packets being transmitted and received. As noted previously, the NIC 12 shields the cell delineation details of asynchronous transfer from the applications running on the host computer system 48. For present purposes, it is assumed that software running on the host computer system 48 manage transmit and receive data using wrap around transmit and receive rings with packet interfaces, as is well known in the art.

Figure 3:
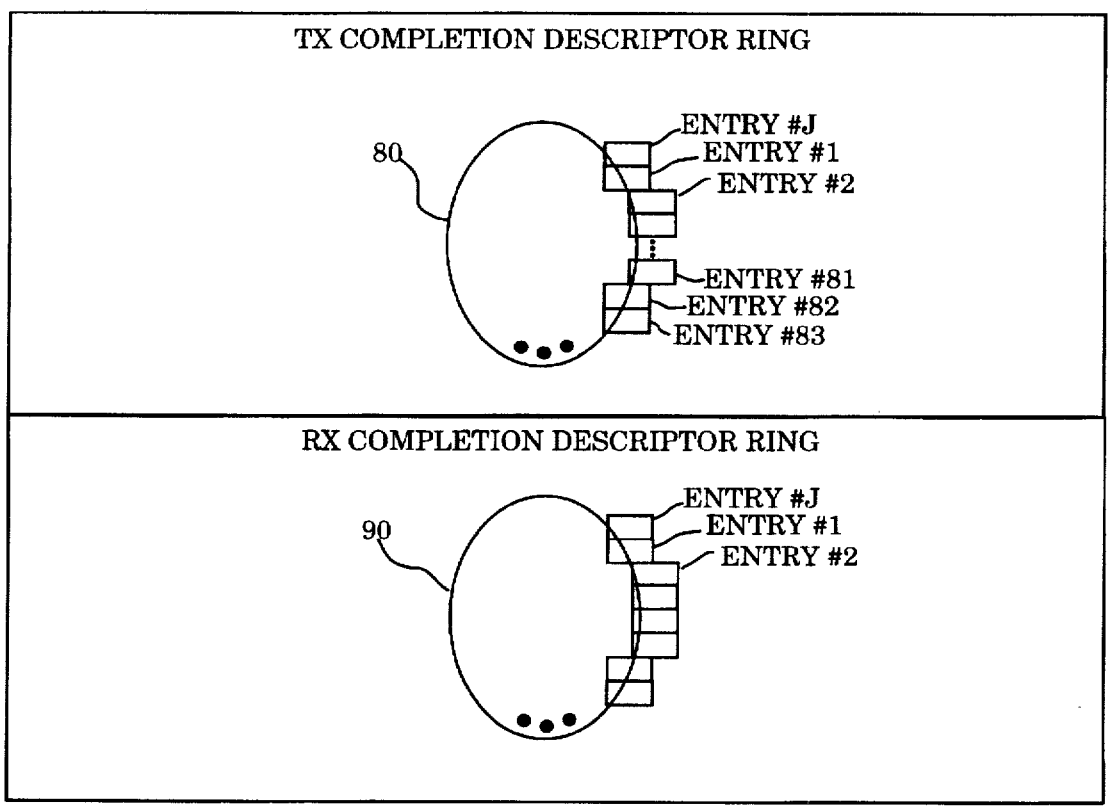
FIG. 3 illustrates a simplified block diagram of a referred data structure of the host memory used for data transmission in a system utilizing the apparatus and method of the present invention.

FIG. 3 illustrates a simplified block diagram of the preferred data structure of the host memory 49 used for reporting data transfer in accordance with the apparatus and method of the present invention. The host memory 49 includes a transmit (TX) completion descriptor ring 80 and a receive (RX) completion descriptor ring 90. The TX completion ring 80 is a data structure having a plurality of ring entries, for example, entries 81, 82, 83. Each of these ring entries 81, 82, 83, accessed by software sequentially and in a circular fashion, is of a sufficient size (e.g., 64 bytes) to contain a descriptor having transaction completion-related information (e.g., descriptor numbers of descriptors available for use by hardware i.e., circuitry, in the Core 22 to report the completion of a transaction).

The TX completion ring 80 is used to report to hardware in the Core 22 the descriptor numbers which are available for use by hardware to post completion updates, as will be discussed in detail in the following sections. In a preferred embodiment, the TX completion ring 80 occupies 64 KBytes of host memory and supports 1,024 ring entries. The TX completion ring 80 is accessible by both software and hardware. The TX completion ring 80 has an OWN bit in each descriptor which is set by software when hardware has ownership of the TX completion ring 80. The present invention utilizes the OWN bit as a semaphore mechanism for indicating that a shared memory location or resource is being utilized by a particular processor. In the present invention, each descriptor includes an OWN bit which is set to a '1' if the entry is owned by hardware or a '0' if the entry is owned by software. The owner of the descriptor is responsible for releasing ownership when it updates the descriptor. Thus, when software has completed the posting of available descriptors to hardware, it sets the OWN bit to a 1 and when hardware has completed the posting of transactional updates, it clears the OWN bit.

The RX completion ring 90, like the TX completion ring 80, is a data structure located in the host memory 49, having a plurality of ring entries. The RX completion ring 90 is used to report to the hardware the descriptors which are available for use by hardware to provide reception completion updates. One TX and one RX completion ring 80 and 90 respectively, are used for reporting the transmit and receive status of multiple channels.

When a descriptor is available for use by the hardware in the Core 22 to report completed transactions, the software running on the host memory issues a "kick" command to the Core 22 in NIC 12. This command is a write operation which provides, as parameters, the TX data ring number (0-126) and the corresponding descriptor number of the last descriptor posted in the ring that is available for use by hardware for posting transactional updates, as will be described in detail below.

In a preferred embodiment, the parameters provided by each "kick" command are written to a first storage field 62 in storage location 60. Thus, the TX data ring number (0-126) and the corresponding descriptor number of the last descriptor posted are written to the first storage field 62. Hardware in the Core 22 assigned to the transferring of data on the NIC 12 also keeps track of the last descriptor, per ring, it has utilized in posting completion updates. This descriptor number is maintained in a second storage field 64 in storage location 60. The hardware checks the contents of the first storage field 62 and the second storage field 64 when it has completed posting completion updates on an available description and is ready to post another completion update, or when it receives a "kick" command. This is accomplished through the use of comparing circuit 66, which compares the contents of the first storage field 62 to the contents of the second storage field 64. As noted above, the comparing circuit 66 may be implemented through the use of an exclusive-OR gate. When the contents of the first storage field 62 and the contents of the second storage field 64 are equal, i.e., when both hardware and software descriptor pointers match, the hardware has utilized the last available descriptor.

Figure 4A:
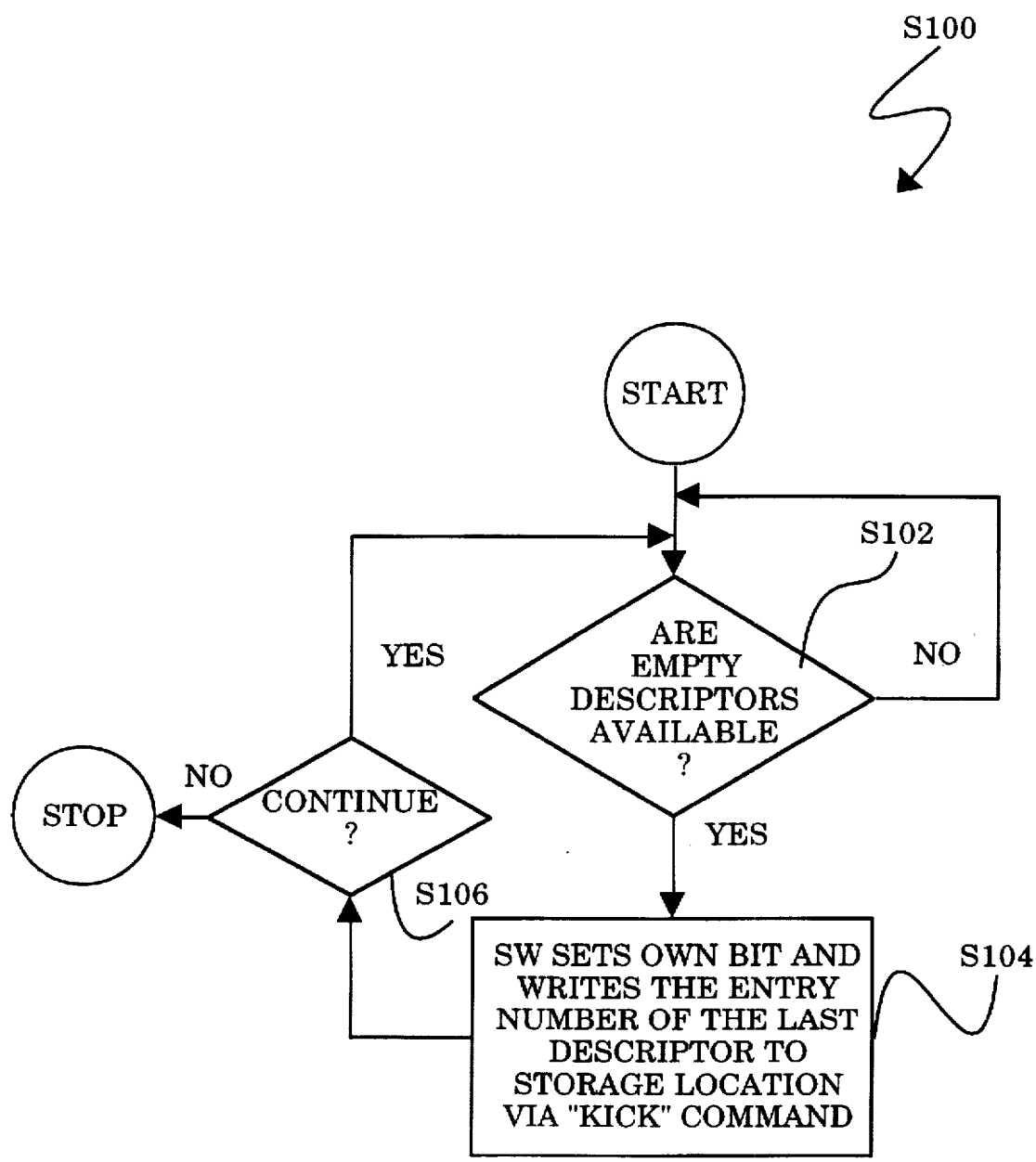
FIGS. 4a and 4b are flowcharts illustrating the process flow of the method of reporting data transfer between hardware and software, in accordance with a preferred embodiment of the present invention.

FIG. 4a is a flowchart illustrating the process flow of the method of reporting data transfer performed by software, in accordance with a preferred embodiment of the present invention. This method may be used to provide status updates using the TX completion descriptor ring 80 for posting transmit completion updates or by using RX completion descriptor ring 90 for posting receive completion updates. For present purposes, only the process of posting use of transmit completion updates using the TX completion descriptor ring 80 will be described. Beginning with a start state, the process S100 inquires if empty descriptors are available on the TX completion ring 80 for posting by software ("SW") running on host memory, as shown in decision block S102. If not, the process S100 returns to decision block S102. Otherwise, the process S100 proceeds to process block S104, where software sets the OWN bit in each empty descriptor and then writes the entry number of the last descriptor into storage field 62 of storage location 60.

Although the process S100 can provide the entry number of each empty descriptor in this manner, it is preferable that the software posts several empty descriptors through a single transaction, so that the process S100 may be optimized. Thus, for example, if software is prepared to provide TX completion descriptors #0-99 to the hardware, it must set the OWN bit of all 100 descriptors (i.e., 100 OWN bits) and then write the value 99 to the TX/RX storage field 62 of storage location 60. As a result, each "kick" command involves the writing of the number of the last available descriptor to a first storage field 62 in storage location 60, providing the TX completion ring number (0-126) and the corresponding number of the last descriptor available. The process S100 then proceeds to decision block S106, where it inquires if it should continue processing. If so, it proceeds to decision block S102. If not, the process S100 terminates.

Figure 4B:
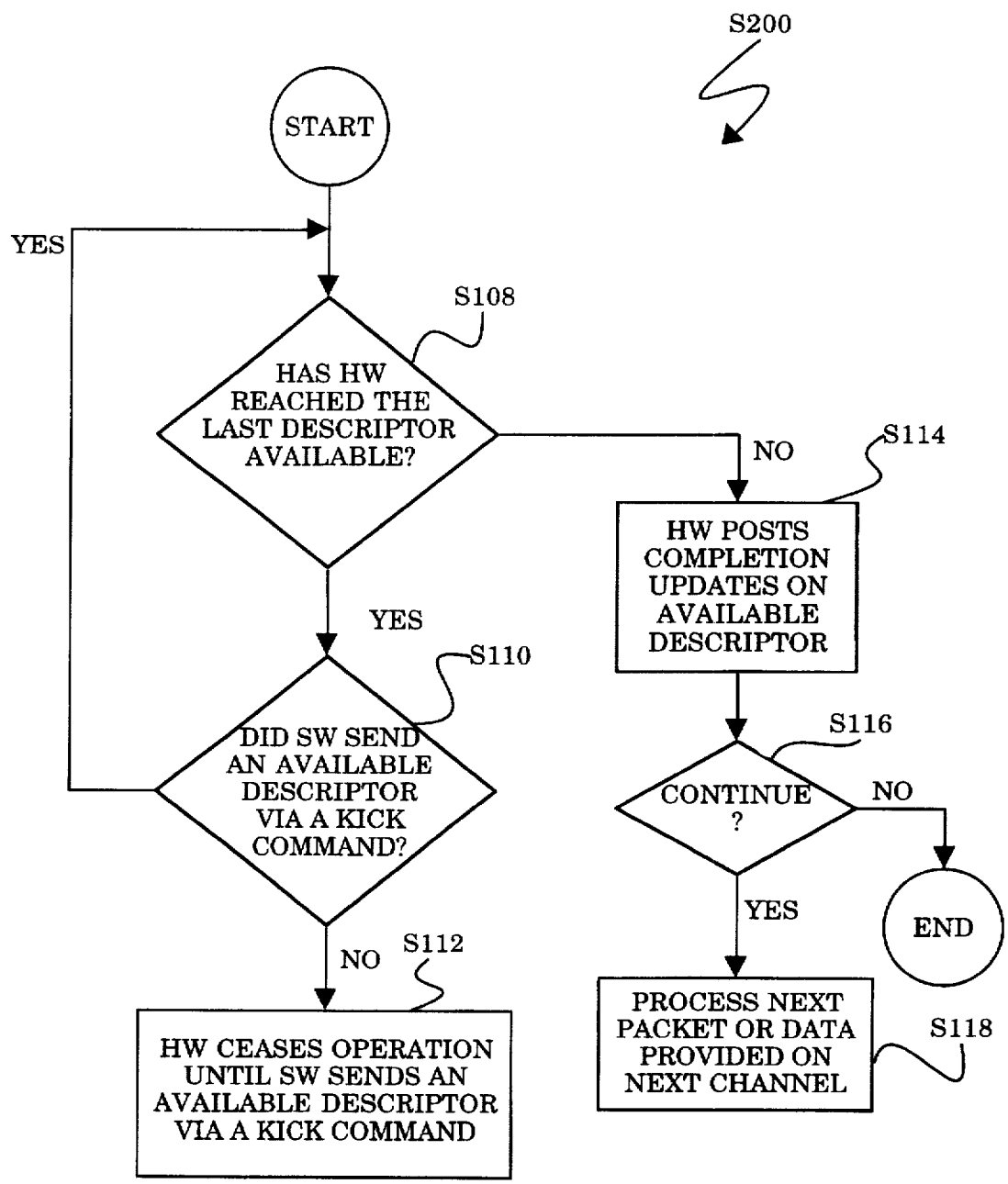

FIG. 4b is a flowchart illustrating the process S200 of posting updates performed by hardware in accordance with the teachings of the present invention. Hardware on the NIC 12 assigned to the transfer of data also keeps track of the last descriptor, per ring, it has utilized for posting completion updates. This descriptor number is maintained in a second storage field 64 in storage location 60. Beginning at a start state, the process S200 begins with the hardware ("HW") checking the contents of the first storage field 62 and the second storage field 64.

To determine if hardware has reached the last descriptor available for use, the hardware compares the contents of the first storage field 62 to that of the second storage field 64, as shown in decision block S108. If the contents of the first storage field 62 and the contents of the second storage field 64 are equal, the hardware has reached the last available descriptor in the TX completion ring 80. As a result, the process S200 proceeds to process block S110, where the process S200 queries if software has sent an available descriptor via a "kick" command. If so, the process S200 returns to block S108. If not, the hardware ceases operation until waken by another software "kick" command, as shown in process block S112.

If the contents of the first storage field 62 and the contents of the second storage field 64 are not equal, the process S200 proceeds to process block S114, where the hardware posts completion updates on the available descriptor or descriptors. Upon processing process block S114, the process S200 proceeds to decision block S116, where the process S200 queries if hardware should continue posting completion updates. If so, the process S200 proceeds to process block S118 to process the next packet or data provided on the next channel. If not, the process S200 terminates. Note that process S100 (which includes process steps S102-S106) operates asynchronously vis-a-vis process S200 (which includes process steps S108-S118).

As is apparent to one skilled in the art, the processes S100 and S200 may be adapted for reporting the status of data received by hardware. Through the use of the present invention, hardware does not have to poll the host memory for completion ring descriptor availability, thus decreasing overhead and processing time.

Modifications and variations of the embodiments described above may be made by those skilled in the technology while remaining within the true scope and spirit of this invention. For instance, the present invention may be implemented in any computer system requiring the reporting of data transfer between software and hardware and is not restricted to data transfer or data transmission utilizing the ATM protocol. In addition, the storage field 62 need not be located in the same storage location 50 as the second storage field 64.

Thus, although the present invention has been described in terms of certain preferred embodiments, other embodiments that will be apparent to those of ordinary skill in the technology are also within the scope of this invention. Accordingly, the scope of the invention is intended to be defined only by the claims which follow.

I claim:

1. A computer system in a network for transferring data, comprising:
   a host device having a host memory, the host memory having at least one data structure having a plurality of entries for posting data, each entry including an entry number;
   a core circuit for transferring and tracking transfer of data between the host device and the network, in response to one of a condition and a command from the host device;
   a storage location coupled to the host device, the storage location having a first storage field and a second storage field, the first storage field for storing the entry number corresponding to an entry which is available for posting data by the host device, the second storage field for storing an entry number corresponding to an entry posted by the core circuit upon the transfer of data; and
   a circuit coupled to the storage location, for generating the condition by comparing the content of the first storage field to the content of the second storage field.

2. The system of claim 1, further comprising a second circuit for posting data, the second circuit being operative if the circuit for comparing determines that the content of the first storage field is not equal to the content of the second storage field.

3. The system of claim 1, further comprising a second circuit for posting data, the second circuit being operative when an entry number corresponding to an entry which is available for posting data is stored in the first storage field.

4. The system of claim 1, wherein the data structure is a descriptor ring comprising the plurality of entries, the entries being arranged in circular fashion.

5. The system of claim 1, wherein the circuit for comparing is an exclusive-OR gate.

6. The system of claim 1, wherein the data structure is a first data structure corresponding to transmit channels for transmitting data.

7. The system of claim 6, further comprising a second data structure and a second storage location, the second storage location having a third storage field and a fourth storage field, wherein the second data structure corresponds to receive channels for receiving data.

8. The system of claim 1, wherein the system is a network system and wherein data is transferred from the host device to the network and from the network to the host device.

9. A circuit for transferring data in a network, the circuit being responsive to a host device having a host memory, the host memory having at least one data structure having a plurality of entries for posting data, each entry including an entry number, the circuit comprising:
   a core circuit for transferring and tracking transfer of data between the host device and the network, in response to one of a condition and a command from the host device;
   a storage location coupled to the host device, the storage location having a first storage field and a second storage field, the first storage field for storing the entry number corresponding to an entry which is available for posting data by the host device, the second storage field for storing an entry number corresponding to an entry posted by the core circuit; and
   a circuit coupled to the storage location, for generating the condition by comparing the content of the first storage field to the content of the second storage field.

10. The circuit of claim 9, further comprising a second circuit for posting data responsive to the circuit for comparing, the second circuit being operative if the circuit for comparing determines that the content of the first storage field is not equal to the content of the second storage field.

11. The circuit of claim 9, further comprising a second circuit for posting data, the second circuit being operative when an entry number corresponding to an entry which is available for posting data is stored in the first storage field.

12. The circuit of claim 9, wherein the data structure is a descriptor ring comprising the plurality of entries, the entries being arranged in circular fashion.

13. The circuit of claim 9, wherein the circuit for comparing is an exclusive-OR gate.

14. The circuit of claim 9, wherein the data structure is a first data structure corresponding to transmit channels for transmitting data.

15. The circuit of claim 14, further comprising a second data structure and a second storage location, the second storage location having a third storage field and a fourth storage field, wherein the second data structure corresponds to receive channels for receiving data.

16. A method for coordinating data transfer in a computer with a network system, the computer having a host device, comprising the steps of:
   issuing a command to a core circuit to transfer data between the host device and the network system;
   tracking transfer of data between the host device and the network system using the core circuit in response to one of a condition and the command;
   storing a first entry number in a first storage field posted by the host device upon the transfer of data, the first entry number corresponding to a memory location available for posting data;
   storing a second entry number in a second storage field posted by the core circuit, the second entry number corresponding to a memory location containing posted data;
   comparing the content of the first storage field to the content of the second storage field;
   posting data to the memory location corresponding to the entry number stored in the first storage field if the content of the first storage field is not equal to the content of the second storage field and terminating the posting of data if the content of the first storage field is equal to the content of the second storage field; and
   generating a condition as a result of the step of posting.

17. The method of claim 16, further comprising the step of posting data to the memory location corresponding to the entry stored in the first storage field if the first entry number corresponds to a memory location available for posting data.

18. The method of claim 16, further comprising the step of providing a host device having a host memory, the host memory having at least one data structure having a plurality of entries for posting data, each entry including an entry number, prior to the first storing step.

19. The method of claim 18, wherein in the step of providing a host device, the data structure is a descriptor ring comprising a plurality of entries, the entries being arranged in circular fashion.

20. The method of claim 16, further comprising the steps of providing a second data structure and a second storage location, the second storage location having a third storage field and a fourth storage field, wherein the data structure is a first data structure which corresponds to transmit channels for transferring data and the second data structure corresponds to receive channels for receiving data.

* * * * *